United States Patent

Fukumoto et al.

Patent Number: 5,163,256
Date of Patent: Nov. 17, 1992

[54] ELASTO-PLASTIC DAMPER FOR STRUCTURE

[75] Inventors: Toshiyuki Fukumoto; Eiji Fukuzawa; Toshikazu Yamada; Naoki Tanaka; Akihiko Amana; Yoshikazu Maeda, all of Tokyo, Japan

[73] Assignee: Kajima Corporation, Tokyo, Japan

[21] Appl. No.: 562,399

[22] Filed: Aug. 3, 1990

[30] Foreign Application Priority Data

Aug. 4, 1989 [JP] Japan .................. 1-202661

[51] Int. Cl.$^5$ .............................. E04B 1/98
[52] U.S. Cl. ........................ 52/167 R; 52/573
[58] Field of Search ........... 411/379; 52/573, 167, 52/167 R; 404/68, 69

[56] References Cited

U.S. PATENT DOCUMENTS

| | | | |
|---|---|---|---|
| 1,052,282 | 2/1913 | Schmitt | 411/379 |
| 1,154,468 | 9/1915 | Wille | 411/379 |
| 4,799,339 | 1/1989 | Kobori et al. | 52/167 |
| 4,823,522 | 4/1989 | White | 52/167 |
| 4,890,430 | 1/1990 | Kobori et al. | 52/167 |
| 4,901,486 | 2/1990 | Kobori et al. | 52/573 |
| 4,922,667 | 5/1990 | Kobori et al. | 52/167 |
| 4,942,703 | 7/1990 | Nicolai | 52/573 |
| 4,959,934 | 10/1990 | Yamada et al. | 52/573 |
| 4,964,246 | 10/1990 | Kobori et al. | 52/167 |
| 5,022,201 | 6/1991 | Kobori et al. | 52/167 |
| 5,025,599 | 6/1991 | Ishii et al. | 52/167 |
| 5,036,633 | 8/1991 | Kobori et al. | 52/167 |
| 5,046,290 | 9/1991 | Ishii et al. | 52/167 |
| 5,065,552 | 11/1991 | Kobori et al. | 52/167 |
| 5,065,555 | 11/1991 | Kobori et al. | 52/167 |
| 5,069,547 | 3/1992 | Tanaka et al. | 52/167 |

FOREIGN PATENT DOCUMENTS

830054  1/1952  Fed. Rep. of Germany ...... 411/380

Primary Examiner—James L. Ridgill, Jr.
Attorney, Agent, or Firm—James H. Tilberry

[57] ABSTRACT

An elasto-plastic damper to protect a building from destructive impact of seismic tremors and/or high winds. The damper is a cylindrical shaft with a constricted waist portion adapted to yield uniformly throughout its length to an external force from any direction in a plane perpendicular to the longitudinal axis of the waist portion. This elasto-plastic deformation of the damper dissipates the energy of seismic and/or wind impact throughout its range of elastic deformation. The ends of the damper are threaded to facilitate threaded fastener engagement with structural and nonstructural members of a building.

13 Claims, 10 Drawing Sheets

ELASTO-PLASTIC DAMPER FOR STRUCTURE

BACKGROUND OF THE INVENTION

1. Field of the Invention

This invention relates to the field of dampers installed between structural and non-structural members of a building to absorb vibrational energy impact to the members caused by seismic tremors and/or high winds.

2. Description of the Prior Art

Prior art dampers include frictional devices, viscous devices, hydraulic devices, and elasto-plastic devices. Among these dampers, the elasto-plastic damper tends to be the most commonly used because this damper is easy to maintain, has the physical property of non-destructive repetitive use, and is capable of great energy absorbability.

To function, the commonly used prior art elasto-plastic damper primarily depends on the relative displacement between an upper structure and a lower structure, or the relative displacement between any story in the structure and the adjacent stories above and/or below the intermediate story. Elasto-plastic dampers utilizing relative displacement require space between the upper and lower members, and space available to install such dampers is usually limited. Prior art dampers are illustrated in U.S. Pat. No. 4,901,486 to Kobori et al., which discloses elasto-plastic dampers of various configurations which require considerable mounting space. The mounting means are relatively complex and time consuming to secure.

OBJECTS OF THE INVENTION

It is among the objects of the present invention to provide an elasto-plastic damper which is small in size, which requires a minimum of space, which is easily and quickly installed, and which is highly efficient in absorption of energy.

SUMMARY OF THE INVENTION

A preferred embodiment of the elasto-plastic damper according to the present invention comprises a substantially cylindrical elasto-plastic portion having a tapered narrow waist and fastening means integral with the opposite ends of the elasto-plastic portion adapted to be secured between spaced-apart structural and non-structural building members. Relative movement between the damper-secured building members causes deformation of the elasto-plastic portion and the absorption of the vibrational energy of the building member. The efficiency of absorption of energy is a function of the scale and proportion of the elasto-plastic portion of the damper.

Threaded fasteners are the preferred means of securing the dampers to building members. The threaded fasteners are of two types. The first type comprises threaded stud portions integrally secured to the opposite ends of the elasto-plastic portion. The second type comprises a threaded stud portion on one end of the elasto-plastic portion and a plain shaft portion, capped with a bolt head, secured to the other end of the elasto-plastic portion.

So long as the damper portion of the elasto-plastic damper has an axially uniform section, the plasticization of the damper is concentrated in a portion of the damper, so that the efficiency of energy absorption is low. With the subject invention, the damper portion may be uniformly plasticized axially throughout its entire length to efficiently absorb the energy by forming the damper portion into a shape which is constricted in the middle so as to correspond to the distribution of a bending moment caused by an external shearing force.

The structural members include spaced-apart beams, pillars and individual beams and/or pillars wherein each is separated mid-span and joined together with one or more of the inventive dampers. Non-structural members include curtain walls, intermediate pillars, and intermediate portions of beams of a frame, each spaced apart one from the other.

DETAILED DESCRIPTION OF THE INVENTION

Figure 1:
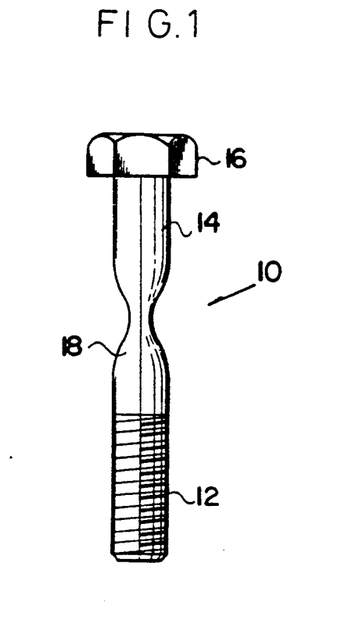
FIG. 1 is an elevational view of a first embodiment of the invention.
Figure 5:
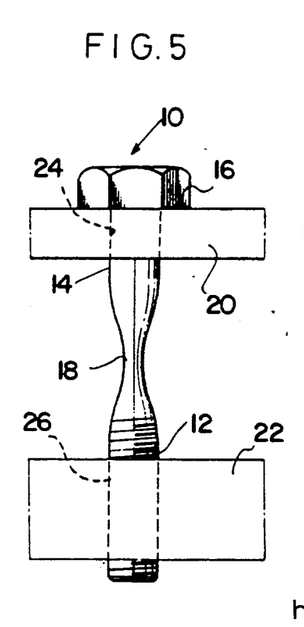
FIG. 5 is an elevational view of the first embodiment of the invention fastened to first and second building members.
Figure 6:
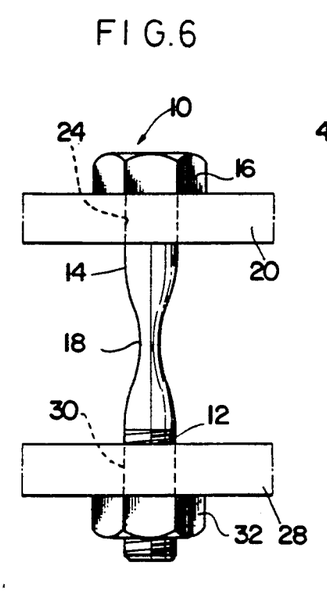
FIG. 6 is an elevational view of the first embodiment of the invention fastened to first and third building members.
Figures 9, 10, 12:
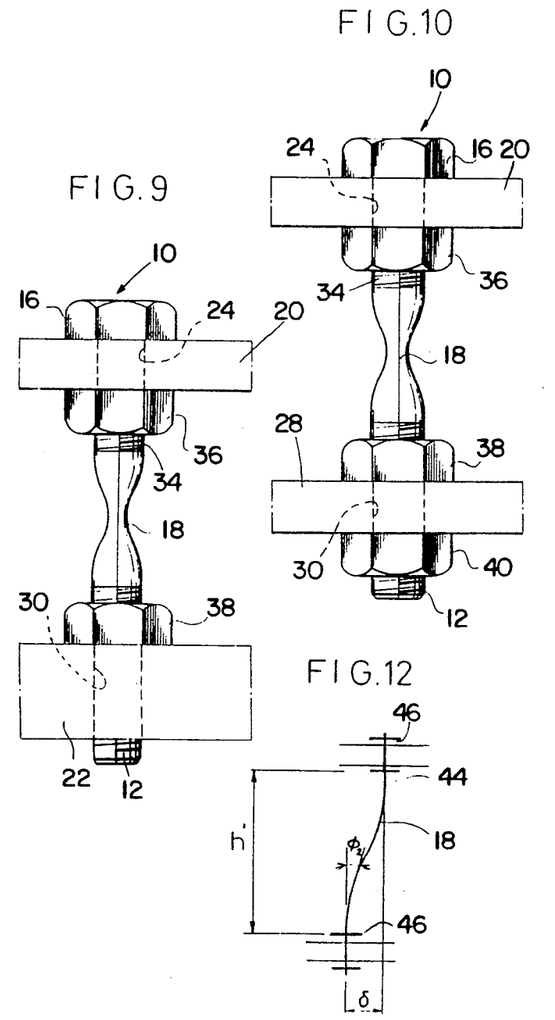
FIGS. 9 through 11 are similar to FIGS. 5 through 7, but with the addition of lock nuts between the building members.
FIG. 12 is a schematic diagram of the deformation of the embodiments of the invention shown in FIGS. 9 through 11.

A first embodiment of the inventive damper 10 is shown in FIG. 1, comprising a threaded shank portion 12, a plain shank portion 14, a bolt head 16, and an elasto-plastic damper portion 18 between and integral with the threaded and plain shank portions 12 and 14. In FIG. 5 the damper 10 is shown fastened to a pair of spaced-apart building members 20 and 22, either or both of which may be structural or non-structural members. Plain shank portion 14 is received in a plain hole 24 of member 20 and threaded shank portion 12 threadedly engages threaded hole 26 of member 22. In FIG. 6 member 28 is provided with either a plain or threaded hole 30 through which threaded shank 12 is received to extend there beyond for threaded engagement with a nut 32. The embodiment of FIG. 9 is similar to the embodiment of FIG. 5, except that shank 34 is threaded and lock nuts 36 and 38 are threadedly received on threaded shanks 12 and 34 to more positively secure damper 10 to members 20 and 22. The embodiment of FIG. 10 is similar to the embodiments of FIG. 9 except that the embodiment of FIG. 10 is secured to a member 28 and includes an additional lock nut 40.

Figure 2:
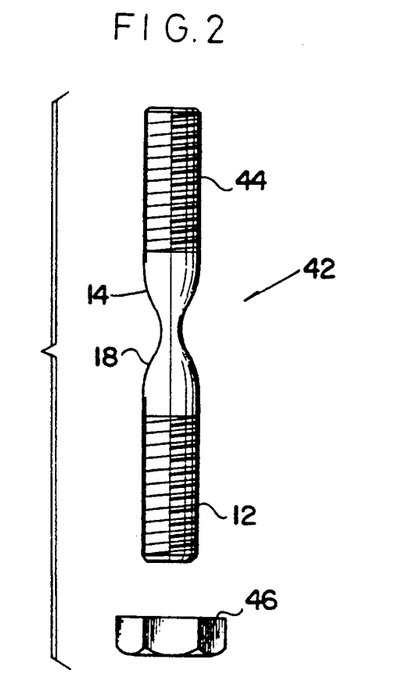
FIG. 2 is an exploded elevational view of a second embodiment of the invention.
Figure 7:
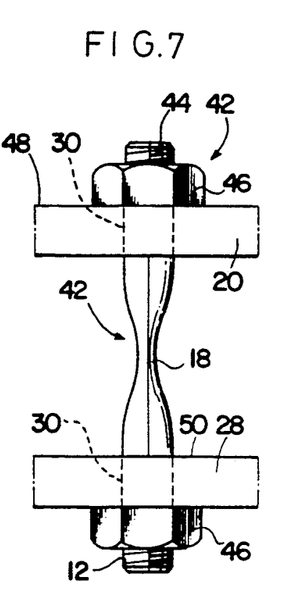
FIG. 7 is an elevational view of the second embodiment of the invention fastened to first and third building members.
Figure 8:
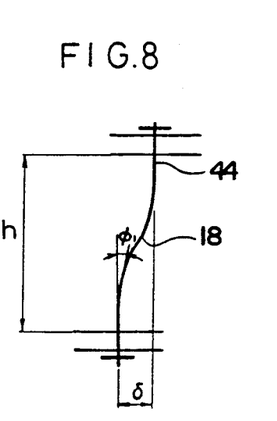
FIG. 8 is a schematic diagram of the deformation of first and second embodiments of the invention when relative movement occurs between spaced apart building members.
Figure 11:
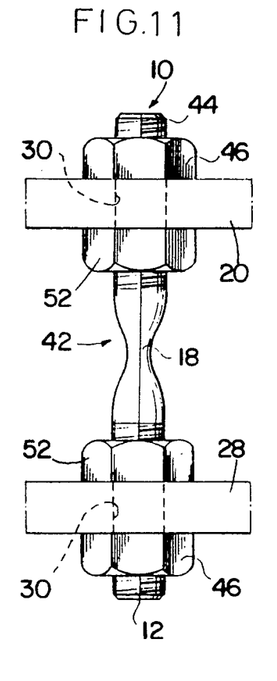

A second embodiment 42 of the inventive damper is shown in FIG. 2, comprising a first threaded shank portion 12, a second threaded shank portion 44, and an elasto-plastic damper portion 18 between and integral with the threaded shank portions 12 and 44. As shown in FIG. 7, damper 42 engages members 20 and 28 through holes 30, which may be either plain or threaded, as required. Nuts 46 threadedly engage the ends of shanks 12 and 44 to provide pressure engagement against surfaces 48 and 50 of members 20 and 28, respectively. The damper embodiment of FIG. 11 is similar to the damper embodiment of FIG. 7, with the exception that the damper embodiment of FIG. 11 includes an additional pair of lock nuts 52 whereby members 20 and 28 are each sandwiched between pairs of nuts 46 and 52.

Figure 3:
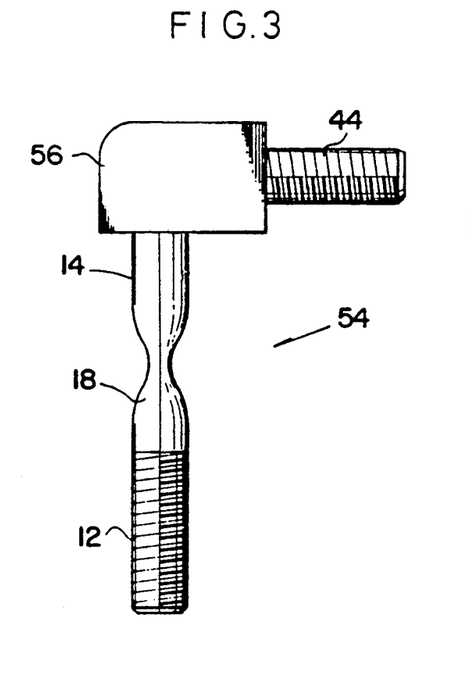
FIG. 3 is an elevational view of a third embodiment of the invention.
Figure 13:
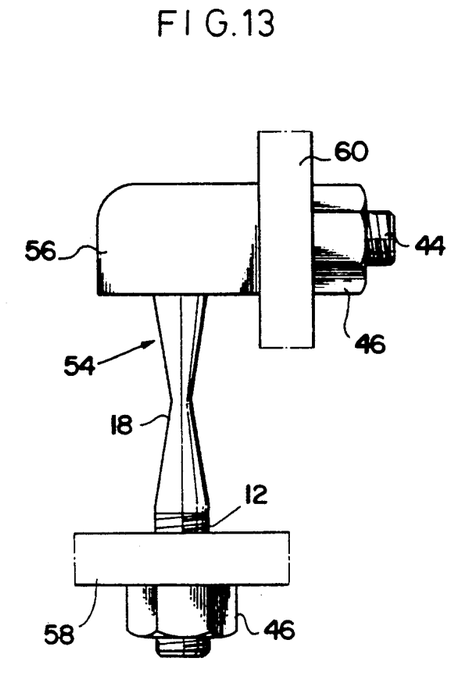
FIG. 13 is an elevational view showing the damper of FIG. 3 fastened to a pair of members.

A third embodiment 54 of the inventive damper shown in FIG. 3 is similar to the above-discussed second embodiment of FIG. 2 to the extent that it comprises a first threaded shank 12, a second threaded shank 44, and an elasto-plastic damper portion 18. Damper 54 differs from damper 42 in that it includes a change of direction adapter 56 intermediate damper portion 18 and shank portion 44 by which to position shank 44 normal to shank 12. As shown in FIG. 13, damper 54 is adapted to be secured, by means of shank 12, to a horizontal member 58 and secured, by means of shank 44, to a vertical member 60. Nuts 46 threadedly engage shanks 12 and 44 to complete the connection of damper 54 to members 58 and 60.

Figure 14:
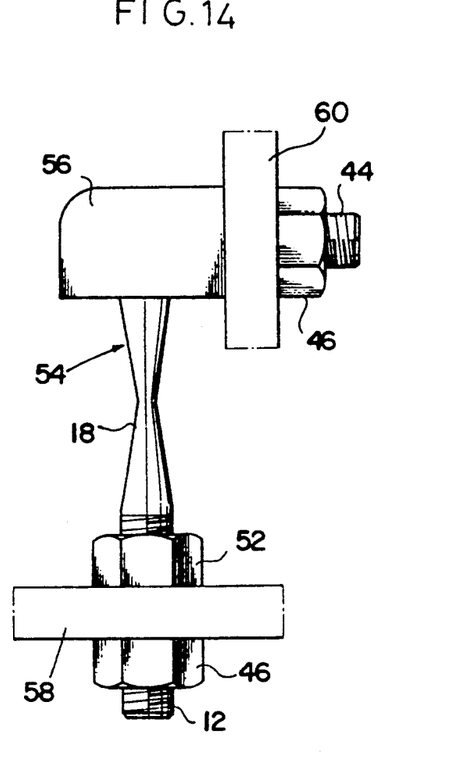
FIG. 14 is an elevational view similar to FIG. 13, but with a lock nut to secure one of the members.

The embodiment of FIG. 14 is substantially similar to the embodiment of FIG. 13, except that in FIG. 14, a lock nut 52 is employed to secure member 58 against nut 46.

Figure 4:
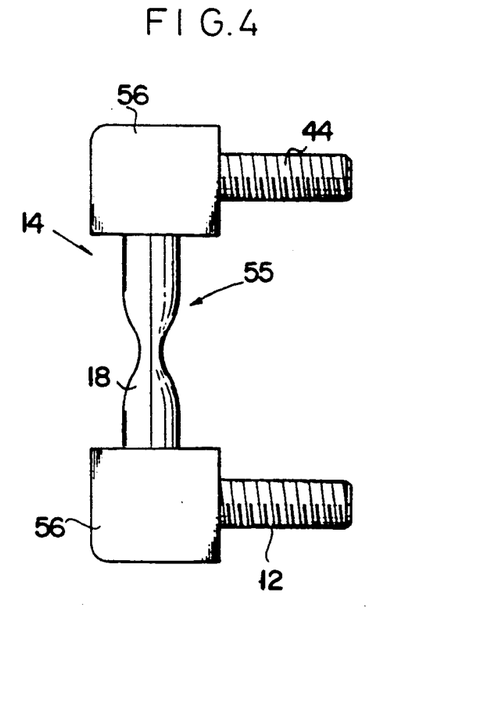
FIG. 4 is an elevational view of a fourth embodiment of the invention.
Figure 15:
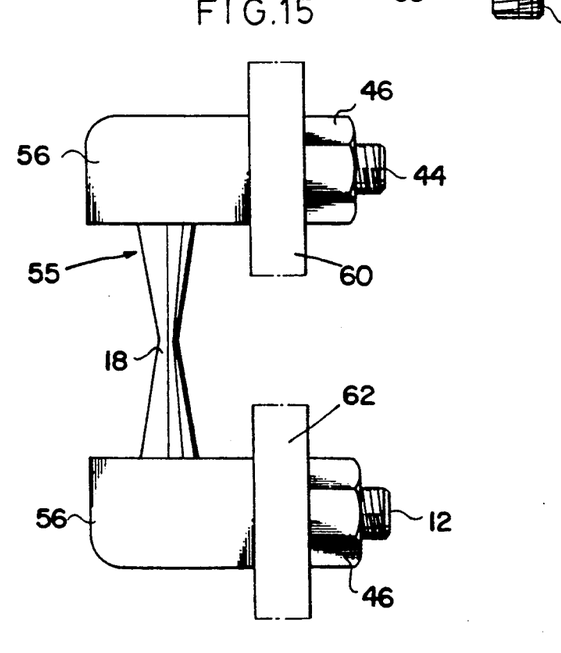
FIG. 15 is an elevational view showing the damper of FIG. 4 fastened to a pair of members.

A fourth embodiment 55 of the inventive damper is shown in FIG. 4, comprising a threaded shank portion 12, a threaded shank portion 44 spaced apart and parallel to shank 12, change of direction adapters 56 secured to the interior ends of shanks 12 and 44, and an elasto-plastic damper portion intermediate and secured to the change of direction adapters normal to the shanks 12 and 44. In FIG. 15, nuts 46 threadedly engage shanks 12 and 44 to pull adapters 56 into pressure engagement with members 60 and 62.

Figure 16:
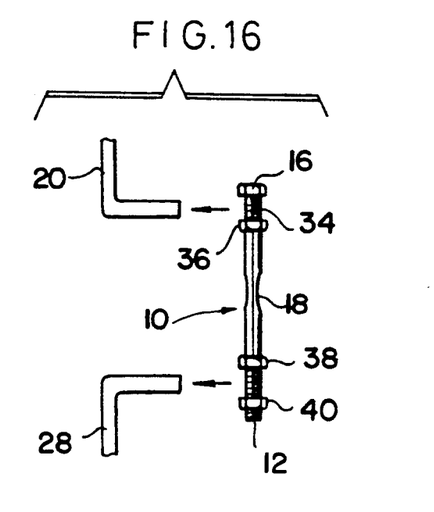
FIG. 16 is an exploded view similar to FIG. 10.
Figure 17:
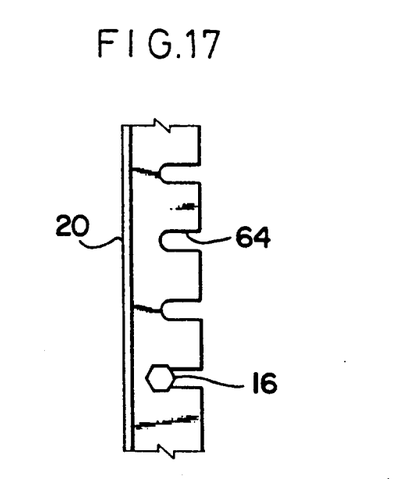
FIG. 17 is a top plan view of the upper member of FIG. 16.

FIGS. 16 and 17 illustrate how the members 20 and 28 may be provided with slots 64 to enable the damper embodiments of FIGS. 1 and 2 to be quickly fastened to, adjusted with, or removed from, structural and/or non-structural members illustrated by members 20 and 28.

Figure 18:
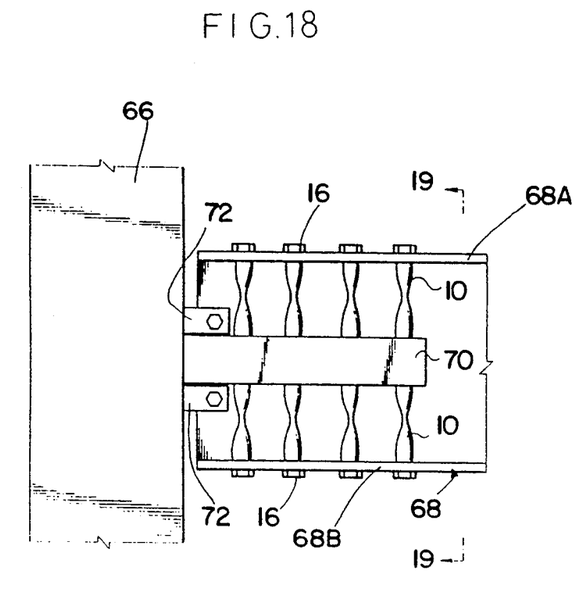
FIG. 18 is an elevational view of a pillar and a beam secured with a plurality of dampers.
Figure 19:
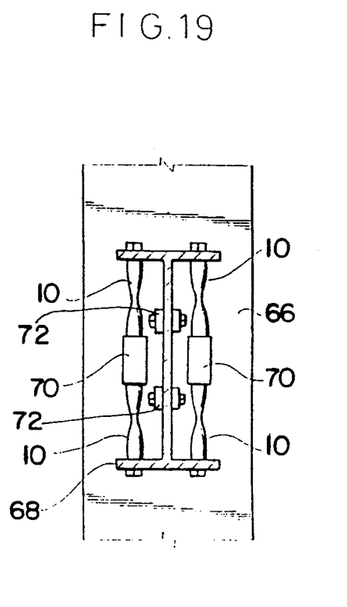
FIG. 19 is a sectional view taken along the line 19—19 of FIG. 18.
Figure 20:
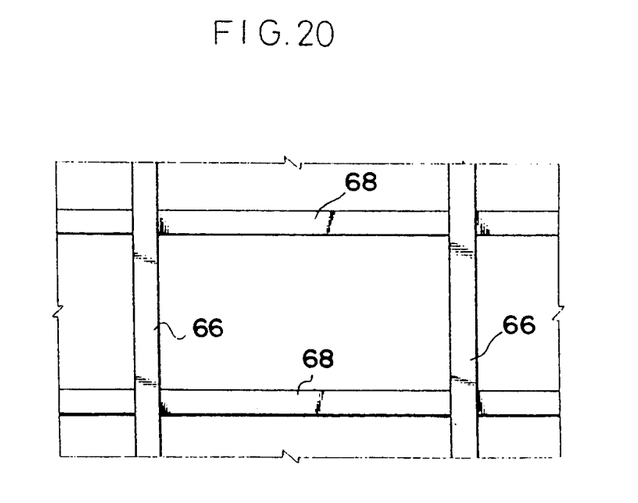
FIG. 20 is an elevational view showing pairs of interconnected pillars and beams protectable by the subject invention.

FIGS. 18 and 19 illustrate yet another application of the dampers of FIGS. 1 and 2. Therein is shown a pillar member 66, a beam member 68, beam to pillar connecting members 70 and 72, and a plurality of dampers 10, threadedly engaged to connecting member 70 and bearing against flanges 68A and 68B in pressure engagement by bolt head means 16. It will be apparent to those skilled in the art that the damper of FIG. 2 may be fastened in like manner wherein nuts 46 would serve the same purpose as bolt heads 16.

Figure 21:
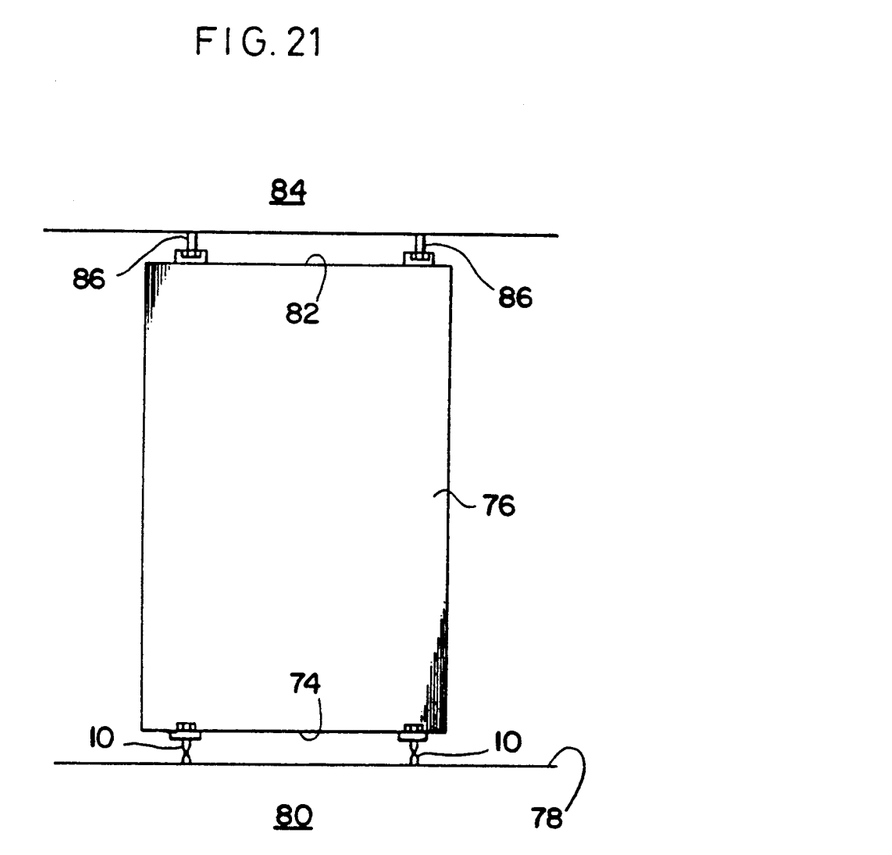
FIG. 21 is an elevational view showing a non-structural member secured to structural members by means of dampers according to the subject invention.

FIG. 21 is illustrative of the use of dampers 10 to secure the lower edge 74 of a non-structural partition wall 76 to the top edge 78 of a structural member 80. In this illustration, the top edge 82 of partition wall 76 is secured to a structural member 84 with standard fastener means 86. It will also be apparent to those skilled in the art that dampers 10 may be substituted for standard threaded fasteners 86 to secure the top edge 82 of partition wall 76 to structural member 84.

Figure 22:
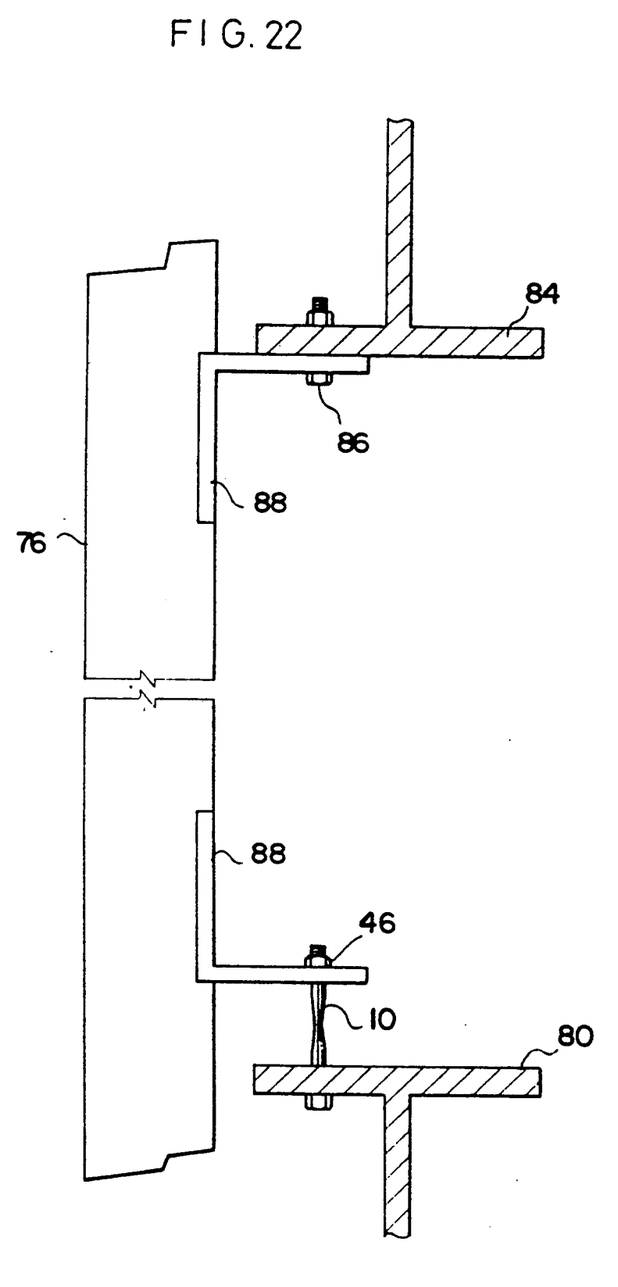
FIG. 22 is an enlarged fragmentary sectional view of a non-structural member secured with standard fastening means to an upper structural member and with dampers, such as shown in FIGS. 1 and 6, to a lower structural member.

FIG. 22 illustrates a modified means to secure partition wall 76 to structural members 80 and 84. A damper 10 connects a partition wall bracket 88 to structural member 80. A threaded fastener 86 connects another wall bracket 88 to structural member 84.

FIGS. 23-26 illustrate applications of the damper 55 shown in FIG. 4.

Figure 23:
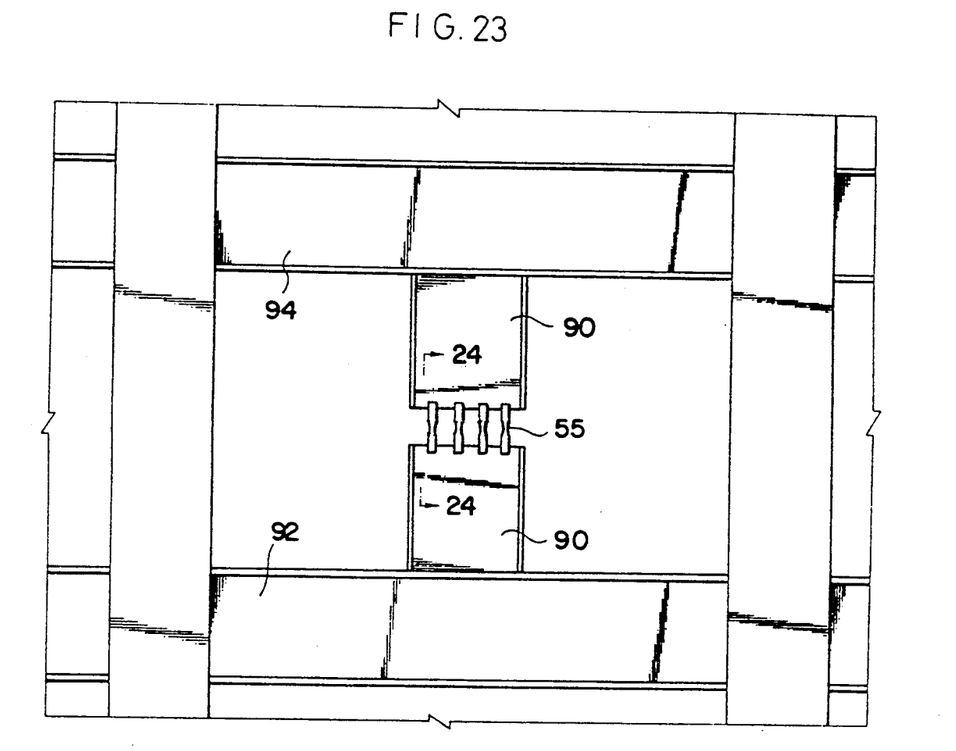
FIG. 23 is an elevational view of an intermediate bifurcated pillar fastened together with dampers such as shown in FIGS. 4 and 15.
Figure 24:
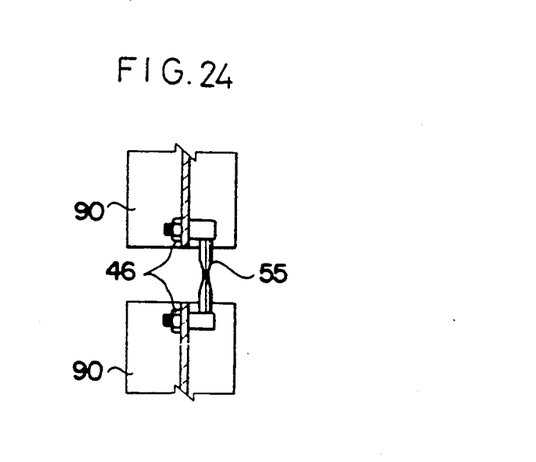
FIG. 24 is a fragmentary sectional view taken along a line 24—24 of FIG. 23.

In FIGS. 23 and 24, an intermediate bifurcated pillar 90, secured to beams 92 and 94, is joined together with a plurality of dampers 55.

Figure 25:
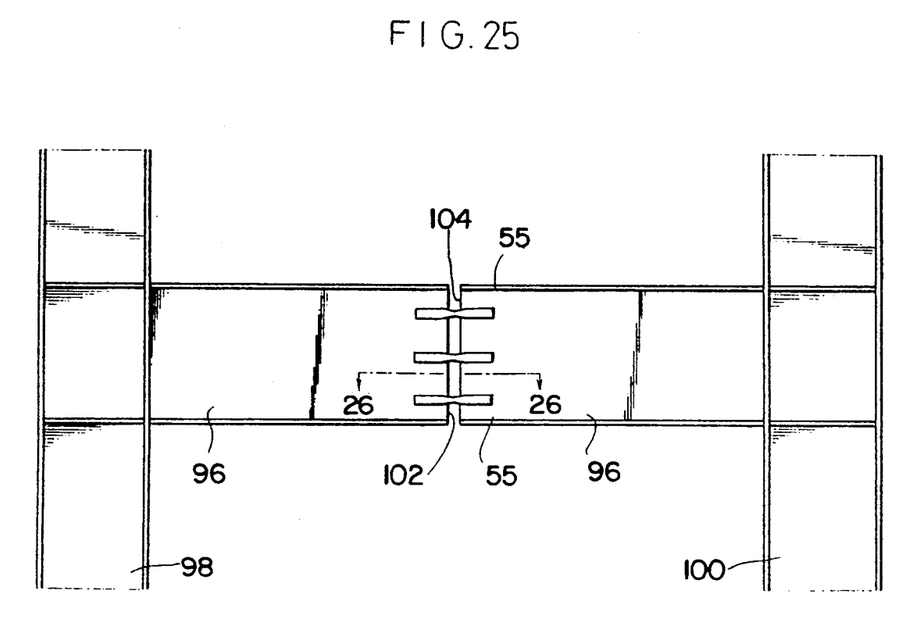
FIG. 25 is an elevational view of a bifurcated beam fastened together with dampers such as shown in FIGS. 4 and 15.
Figure 26:
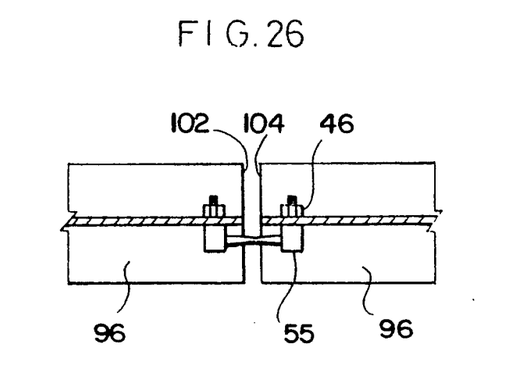
FIG. 26 is a fragmentary sectional view taken along the line 26—26 of FIG. 25.

In FIGS. 25 and 26, an application of dampers 55 is shown wherein a bifurcated beam 96, secured to pillars 98 and 100, is applied to secure the interior ends 102 and 104 of bifurcated beam 96.

Selective application of dampers 10, 42, 54, and 55 of FIGS. 1 through 4, respectively, to structural and non-structural members of a building will absorb and dissipate the energy of seismic tremors and high winds, thereby protecting the building members from destructive direct impact of such external forces. It will be noted that common to all embodiments of the invention is a cylindrical shaft 14 with constricted waist portion 18. With this configuration, the waist portion 18 yields uniformly throughout its length to an external force from any direction in a plane perpendicular to the longitudinal axis of the waist portion 18. This elasto-plastic deformation efficiently operates to dissipate the energy of seismic and/or wind impact throughout its range of elasto-plastic deformation. Thus, by determining the energy dissipating capacity of each damper and by calculating the maximum energy impact expected to be sustained by a building, it is possible to calculate the number of dampers required to be installed in a building to provide maximum impact energy protection.

It will occur to those skilled in the art, having read the described preferred embodiments of the invention and having read the specification in conjunction with a study of the drawings, that certain modifications may be made to the invention. However, it is intended that the invention be limited only by the scope of the appended claims.

What is claimed is:

1. Means for protecting a building against destructive seismic vibration or high winds comprising: a bifurcated building structure provided with cylindical damper rod receiving holes in each bifurcated portion; and solid cylindrical elasto-plastic damper rods, each having shank opposite end portions secured in said circular damper rod receiving holes, at least one of said shank opposite end portions being threaded to receive a threaded fastener thereon, and each of said elasto-plastic rods having a constricted waist portion between said shank end portions, adapted to elasto-plastically yield uniformly throughout its length responsive to an external force from any direction in a plane perpendicular to the longitudinal axis of said waist portion, whereby elasto-plastic deformation of said waist portion dissipates energy of seismic and/or wind impact against said building uniformly throughout the length of said waist portion.

2. The elasto-plastic damper rod of claim 1, wherein both of said shank end portions are threaded, at least one of said damper rod receiving holes is threaded, and means to threadedly secure said threaded shank end portions to said building members.

3. The elasto-plastic damper rod of claim 2, wherein said shank portions are in axial alignment.

4. Means for protecting a building against destructive seismic vibration or high winds comprising: a bifurcated building structure provided with cylindrical damper rod receiving holes in each bifurcated portion; and solid cylindrical elasto-plastic damper rods, each having shank opposite end portions secured in said circular damper rod receiving holes, said shank opposite end portions being threaded to receive threaded fasteners thereon, each of said elasto-plastic rods having a constricted waist portion between said shank end portions adapted to elasto-plastically yield uniformly throughout its length responsive to an external force from any direction in a plane perpendicular to the longitudinal axis of said waist portion, whereby elasto-plastic deformation of said waist portion dissipates energy of seismic and/or wind impact against said building uniformly throughout the length of said waist portion, at least one of said shank portions being normal to the other of said shank portions.

5. The elasto-plastic damper rod of claim 4, including an adapter secured to one of said shank portions intermediate said waist portion and the threaded portion of said shank end portion, said adapter being adapted to align said threaded portion normal to the other of said shank portions.

6. The elasto-plastic damper rod of claim 4 wherein said shank end portions are aligned in parallel relationship.

7. The elasto-plastic damper rod of claim 6 including an adapter secured to each of said shank portions intermediate said waist portion and the respective threaded portions of said shank end portions in parallel relationship.

8. In the combination of a building pillar and a building I-beam having upper and lower flanges and a web therebetween secured to said pillar, the improvement comprising: said I-beam being laterally spaced from said pillar; means to secure said I-beam to said pillar in said laterally spaced relationship; rigid plate means secured to said pillar and projecting therefrom horizontally intermediate said upper and lower flanges of said I-beam; and elasto-plastic damper means secured between said I-beam flanges and said rigid plate means and adapted to elasto-plastically deform and thereby dissipate energy upon vibrational impact by external forces, whereby elasto-plastic deformation of said damper means protects said pillar and said beam from destructive vibration caused by said external forces; said elasto-plastic damper means comprising solid cylindrical rods having threaded shank end portions and constricted waist portions; means to threadedly secure said threaded shank end portions to said rigid plate means; and means to secure the opposite ends of said solid cylindrical rods to said upper and lower flanges of said I-beam, wherein said elasto-plastic damper means elasto-plastically deform responsive to movement between said I-beam and said pillar.

9. The combination of claim 8, wherein said I-beam is adapted to pivot in a vertical plane about said means to secure said I-beam to said pillar, whereby said damper means are elasto-plastically deformed by the relative movement between said I-beam flanges and said rigid plate means.

10. In the structural combination of a pair of vertically spaced apart building beams and a pillar secured therebetween, the improvement comprising: said pillar being secured by its remoted ends to said beams and having bifurcated portions intermediate said remote ends; damper rod receiving holes in said bifurcated portion of said pillar; and elasto-plastic damper rod means bridging and integrally secured to said bifurcated pillar portions adapted to elasto-plastically deform responsive to relative movement between said bifurcated portions, whereby elasto-plastic deformation of said damper means dissipates energy of seismic and/or wind impact against said structural combination, said elasto-plastic damper means comprising a plurality of dampers, each of which includes a solid cylindrical rod having shank end portions and a constricted waist portion therebetween, said waist portion being adapted to elasto-plastically yield uniformly throughout its length responsive to said energy of seismic and/or wind impact against said structural combination, wherein each of said elasto-plastic dampers comprises parallel, spaced apart, threaded shank portions normal to a constricted waist portion therebetween, said shank portions being adapted to be received in said holes in said bifurcated pillar portions.

11. The structural combination of claim 10, wherein said damper includes adapter means on opposite ends of said waist portion, and threaded fasteners on said threaded shank means, whereby said bifurcated ends of said pillars are sandwiched between said adapter means and said threaded fastener means.

12. In the structural combination of a pair of structural building pillars and a beam secured therebetween, the improvement comprising: said beam being secured at its remote end s to said pillars and having bifurcated portions intermediate said remote ends; damper rod receiving holes in said bifurcated portions of said beam; and elasto-plastic damper means bridging and integrally secured to said bifurcated portions adapted to elasto-plastically deform responsive to relative movement between said bifurcated portions, whereby elasto-plastic deformation of said damper means dissipates energy of seismic and/or wind impact against said structural combination; said elasto-plastic damper means comprising a plurality of dampers, each of which includes a solid cylindrical rod having shank end portions and a constricted waist portion therebetween, said waist portions being adapted to elasto-plastically yield uniformly throughout its length responsive to said energy of seismic and/or wind impact against said structural combination, wherein each of said elasto-plastic dampers comprises parallel, spaced apart, threaded shank portions normal to said constricted waist portion between said shank end portions, aid shank end portions being adapted to be received in said holes in said bifurcated pillar portions.

13. The structural combination of claim 12, wherein said damper includes adapter means on opposite ends of said waist portion, and threaded fasteners on said threaded shank means, whereby said bifurcated ends of said beams are sandwiched between said adapter means and said threaded fastener means.

* * * * *